US008050880B2

(12) United States Patent
Pillai et al.

(10) Patent No.: US 8,050,880 B2
(45) Date of Patent: Nov. 1, 2011

(54) GENERATION OF A CONSTANT ENVELOPE SIGNAL

(75) Inventors: Unnikrishna Sreedharan Pillai, Harrington Park, NJ (US); Ke Yong Li, Jackson Heights, NY (US)

(73) Assignee: C & P Technologies, Inc., Closter, NJ (US)

( * ) Notice: Subject to any disclaimer, the term of this patent is extended or adjusted under 35 U.S.C. 154(b) by 503 days.

(21) Appl. No.: 12/259,522

(22) Filed: Oct. 28, 2008

(65) Prior Publication Data

US 2010/0106442 A1   Apr. 29, 2010

(51) Int. Cl.
*G01R 23/16* (2006.01)
(52) U.S. Cl. .............. 702/77; 702/66; 702/70; 702/71
(58) Field of Classification Search .............. 708/404, 708/405; 702/66, 70, 71, 77; 382/280; 370/210; 342/196
See application file for complete search history.

(56) References Cited

U.S. PATENT DOCUMENTS

| 5,067,158 | A  * | 11/1991 | Arjmand ..................... 704/219 |
| 7,486,744 | B2 * | 2/2009 | Shako et al. ................. 375/296 |
| 7,746,761 | B2 * | 6/2010 | Green ......................... 370/206 |

OTHER PUBLICATIONS

Balestra et al. 'A Generalized Modulation Law for Generating Constant Envelope Spread Spectrum Signals via Frequency Modulation', 2004, NDES Publication, pp. 79-82.*
Frequency notched waveforms for medical ultrasound imaging, Michael J. Bennett, Tom Anderson, W. Norman McDicken, Department of Medical Physics, University of Edinburgh, 2007 IEEE Ultrasonics Symposium, pp. 789-792.
Image Recovery: Theory and Application, Edited by Henry Stark, Dept. of Electrical, Computer, and Systems Engineering, RPI, Troy New York, 1987, Academic Press, Inc., pp. 29-30, 46-49.
Image Restoration by The Method of Generalized Projections With Application to Restoration From Magnitude, Levi and Stark, Dept. of Electrical, Computer, and Systems Engineering RPI, Troy, New York © 1984, IEEE, pp. 37.5.1-37.5.4.

* cited by examiner

*Primary Examiner* — Eliseo Ramos Feliciano
*Assistant Examiner* — Elias Desta
(74) *Attorney, Agent, or Firm* — Walter J. Tencza, Jr.

(57) ABSTRACT

One or more embodiments of the present invention relates to an iterative method for generating an almost-constant, nearly constant, or substantially-constant envelope time signal with prescribed Fourier transform magnitude in the frequency domain, and a constant envelope time signal whose Fourier transform magnitude closely matches the prescribed Fourier transform magnitude in the frequency domain. Different starting points for the iterative algorithm give rise to different solutions and their accuracy can be adjusted using a monotonic error criterion presented here.

24 Claims, 9 Drawing Sheets

GENERATION OF A CONSTANT ENVELOPE SIGNAL

STATEMENT REGARDING FEDERALLY SPONSORED RESEARCH OR DEVELOPMENT

The present invention is based upon work supported and/or sponsored by the Air Force Research Laboratory (AFRL), Rome, N.Y., under contract No. FA8750-06-C-0202.

FIELD OF THE INVENTION

The present invention relates to radar, sonar and wireless signal processing.

BACKGROUND OF THE INVENTION

In radar and communication systems for various practical reasons such as peak power efficiency and system efficiency, a constant envelope signal in time domain is desired as the transmit signal. Usually the Fourier transform magnitude (frequency domain) of the transmit signal may be known because of optimization considerations involving the known target and interference spectral characteristics. In that case, the problem is to generate a constant envelope signal in the time domain as in FIG. 1B whose Fourier transform magnitude function matches with the prescribed Fourier transform magnitude in the frequency domain (FIG. 1A).

Previous methods to generate specific cases of this general problem—specifically a chirp-like signal with constant envelope that has a notched spectrum—is described in a patent by Ferrell and Woody [U.S. Pat. No. 5,852,418, Notched-Spectrum Swept-Frequency Generator and Method Therefore, U.S. patent Issued on Dec. 22, 1998], as well as in [M. J. Bennett, T. Anderson, and W. N. McDicken, "Frequency Notched Waveforms for Medical Ultrasound Imaging", 2007 IEEE Ultrasonic Symposium, pp. 789-792, New York, N.Y., 28-31 Oct. 2007]. The methods described in those previous works mainly address generating a constant envelope signal with notched type of spectrum by exploring variations of the method for generating the standard chirp signal.

SUMMARY OF THE INVENTION

One or more embodiments of the present invention provide an iterative method for generating an almost-constant or substantially constant envelope time signal with prescribed Fourier transform magnitude in the frequency domain, or a constant envelope time signal with Fourier transform magnitude that closely matches a prescribed Fourier transform magnitude in the frequency domain that are applicable to radar, sonar and wireless communications.

In the present invention an entirely new approach is outlined to address the problem of generating constant envelope signals with given Fourier transform magnitude using the properties of convex sets and convex-like sets and projection based algorithms or methods. As is well known, many useful notions in signal processing can be expressed in terms of convex sets. [D. C. Youla, "Mathematical Theory of image Restoration by the Method of Convex projections," Chapter 2, Theorem 2.4-1, in Image Recovery: Theory and Application edited by H. Stark, pages 29-77, Academic press, Inc., New York]. Members of a convex set satisfy the convexity constraint which states that if C is a convex set with $f_1 \in C$ and $f_2 \in C$, then their convex linear combination also belongs to C. Thus from FIG. 2

$$f = \alpha f_1 + (1-\alpha) f_2 \in C, \ 0 \le \alpha \le 1. \tag{1}$$

Convex sets have the remarkable property that for any point x outside C, there exists a "unique" nearest neighbor $x_o$ that belongs to C; i.e., for any arbitrary x, there exists a unique vector $x_o \in C$ such that [D. C. Youla, "Mathematical Theory of image Restoration by the Method of Convex projections," Chapter 2, Theorem 2.4-1, in Image Recovery: Theory and Application edited by H. Stark, pages 29-77, Academic press, Inc., New York.]

$$\|x-x_o\| \le \|x-x_1\|, \text{ for all } x_1 \in C. \tag{2}$$

In other words, such an $x_o$ satisfies the infimum condition $$\inf_{x_1 \in C} \|x - x_1\| = \|x - x_o\| \tag{3}$$

where x is any arbitrary vector. This unique member $x_o$ is known as the projection of x onto C. Thus in FIG. 3

$$x_o = Px \tag{4}$$

where P is the projection operator associated with the closed convex set C that assigns a unique nearest neighbor Px in C for any x. Projection operators onto closed convex sets are non-expansive operators, i.e., $$\|Px-Py\| \le \|x-y\|. \tag{5}$$

Many useful notions in signal processing form convex sets. For example, the set of all signals that are band limited to $B_o$ forms a convex set $C_{B_o}$, since if $f_1(t)$ and $f_2(t)$ are both band limited to $B_o$, then $\alpha f_1(t)+(1-\alpha)f_2(t)$ is also band limited to $B_o$. As a result, given any signal f(t), it is easy to show that its projection onto $C_{B_o}$ is given by band limiting its Fourier transform $F(\omega)$ to $B_o$ (setting $F(\omega)=0$, $|\omega|>B_o$). Thus $$P_{B_o} f(t) \leftrightarrow \begin{cases} F(\omega), & |\omega| \le B_o \\ 0, & |\omega| > B_o \end{cases}. \tag{6}$$

Similarly, the set of all signals with bounded envelope property also forms a convex set $C_c$ and for any signal f(t) its projection onto $C_c$ is given by $$P_c f(t) = \begin{cases} f(t), & |f(t)| \le c \\ +c, & f(t) > c \\ -c, & f(t) < c, \end{cases} \tag{7}$$

where c represents the desired upper bound on the envelope.

In a similar manner, the set of all nonnegative signals forms a convex set $C_+$. Given any f(t) its projection onto $C_+$ is given by setting its negative part to zero, i.e., $$P_+ f(t) = \begin{cases} f(t), & f(t) \ge 0 \\ 0, & f(t) < 0 \end{cases}. \tag{8}$$

The set of all signals with finite nonzero support (0, T) also forms a convex set $C_T$. Given any f(t), its projection onto $C_T$ is given by setting its nonzero part outside the desired interval to zero. Thus $$P_T f(t) = \begin{cases} f(t), & 0 < t < T \\ 0, & \text{otherwise.} \end{cases} \quad (9)$$

Another example is the set of all signals with a common phase function $\phi(\omega)$ in the frequency domain. All such signals form a convex set since if $f_1(t) \leftrightarrow F_1(\omega) = A_1(\omega)e^{j\phi(\omega)}$ and $f_2(t) \leftrightarrow F_2(\omega) = A_2(\omega)e^{j\phi(\omega)}$, then their convex combination (Here and elsewhere the two-sided arrow $\leftrightarrow$ represents the Fourier transform pair)

$$f(t) = \alpha f_1(t) + (1-\alpha)f_2(t) \leftrightarrow \alpha F_1(\omega) + (1-\alpha)F_2(\omega) \quad (10)$$
$$= \{\alpha A_1(\omega) + (1-\alpha)A_2(\omega)\}e^{j\varphi(\omega)} = A(\omega)e^{j\varphi(\omega)}$$

preserves the same phase function $\phi(\omega)$.

If the signal f(t) satisfies convex properties associated with several closed convex sets $C_1, C_2, C_n$, then f(t) belongs to their intersection C, a closed convex set, i.e., $$f(t) \in C_o = \bigcap_{i=1}^{n} C_i. \quad (11)$$

In this case, the problem is to find a signal f(t) that belongs to $C_o$ given the various convex properties and their projection operators satisfied by the unknown signal. Since determining the overall projection operator is difficult, in this context, the method of alternating projections has been shown to be very useful [L. G. Gubin, B. T. Polyak, and E. V. Raik, "The Method of Projections for Finding the Common Point of Convex Sets", U.S.S.R. Computational Mathematics and Mathematical Physics, Vol. 7, No. 6, pp. 1-24, 1967; Also D. C. Youla, "Generalized Image Restoration by the Method of Alternating Projections", IEEE Transactions on Circuits and Systems, Vol. 25, pp. 694-702, Sep. 1978.]

The constant envelope signal or the almost-constant, nearly constant, or substantially constant envelope signal whose Fourier transform magnitude matches the given Fourier transform magnitude function can be used in a variety of applications such as radar, sonar, and communication scenes. In all these cases, usually using the target/channel and interference/noise spectral characteristics, it may be possible to prescribe an optimum spectral magnitude characterization for the transmit signal. Often these transmit signals need to be constant envelope as well, to maintain uniform power constraints.

One or more embodiments of the present invention provide a method and an apparatus for generating an almost-constant envelope time signal with prescribed Fourier transform magnitude in the frequency domain, or a constant envelope time signal with Fourier transform magnitude that closely matches a prescribed Fourier transform magnitude in the frequency domain. Further the method and apparatus of an embodiment of the present invention can be used to generate constant envelope signals that are closest to a given signal with the same Fourier transform magnitude within any given degree of accuracy.

In one embodiment of the present invention an input signal is received at a data input device during an initialization step, wherein a first modified time signal equals the input signal during the initialization step. A given Fourier transform magnitude function is also received.

The following steps are repeated for one or more iterations starting with a first Iteration. At the start of each iteration, a computed Fourier transform function of the first modified time signal is computed, wherein for each iteration, each computed Fourier transform function is comprised of a computed Fourier transform magnitude function and a computed phase function in the frequency domain. The computed Fourier transform magnitude function for this iteration is replaced with the given Fourier transform magnitude function to form a modified Fourier transform function for this iteration comprised of the given Fourier transform magnitude function and the computed phase function for this iteration. An inverse Fourier transform is performed on the modified Fourier transform function for this iteration to obtain a second modified time signal in the time domain, wherein the second modified time signal for this iteration has a magnitude and phase function in the time domain. If the difference between the first modified time signal for this iteration and the second modified time signal for this iteration is less than an error threshold, the second modified time signal is transmitted as an output from a transmitter and the iterations are stopped. The magnitude of the second modified time signal is replaced with a constant to form a revised first modified time signal for this iteration. If the difference between the revised first modified time signal and the second modified time signal is less than the error threshold, the first modified time signal is transmitted out from a transmitter, and the iterations are stopped. If the difference between the revised first modified signal and the second modified time signal is not less than the error threshold starting a next iteration, wherein the first modified time signal for the next iteration is equal to the revised first modified time signal of this iteration.

DETAILED DESCRIPTION OF THE DRAWINGS

Figure 1A:
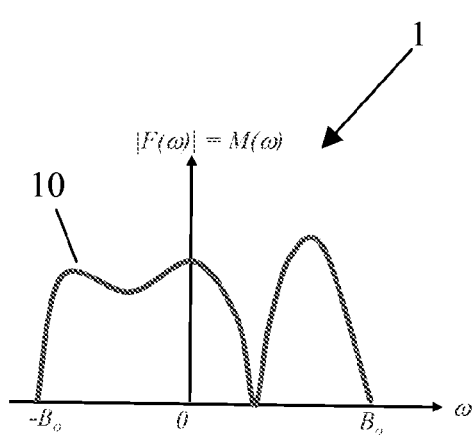
FIG. 1A shows a diagram of a first given Fourier transform magnitude function $M(\omega)$ in the frequency domain.

FIG. 1A shows a diagram 1. The diagram 1 includes an x axis labeled $\omega$ for frequency, and a y axis labeled $M(\omega)=|F(\omega)|$ which indicates magnitude of a Fourier transform of a signal as a function of frequency. The prior art diagram 1 includes a curve 10 which illustrates a first given or arbitrary magnitude of Fourier Transform function $M(\omega)$ versus frequency for a first given or arbitrary signal. $B_0$ shown on the x-axis indicates the first given signal bandwidth.

The first given signal corresponding to the first given Fourier Transform magnitude function shown in FIG. 1A and/or the first given Fourier Transform itself provide one of the key components required at a stage 802 of an iterative method in accordance with an embodiment of the present invention to be described later with reference to FIG. 8.

Figure 1B:
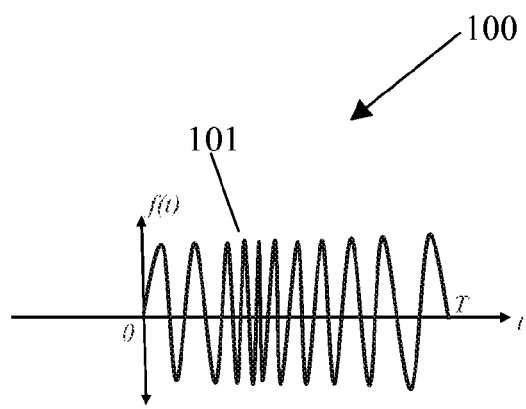
FIG. 1B shows a diagram of a first given signal f(t) with constant envelope property in the time domain, and whose Fourier transform magnitude should ideally correspond to the first given Fourier transform magnitude function $M(\omega)$ in FIG. 1A.

FIG. 1B shows a diagram 100. The diagram 100 includes an x axis labeled t for time, and a y axis labeled f(t) which indicates amplitude of a signal as a function of time. The prior art diagram 100 includes a curve 101 which depicts a first given signal versus time t. The value T shown on the x axis refers to a particular instant of time. The curve 101 depicts a first given signal, ideally corresponding to the FIG. 1A transform, having a constant envelope in the time domain. The curve 101 is the end product of a stage 808 to be described later with reference to FIG. 8.

Figure 2:
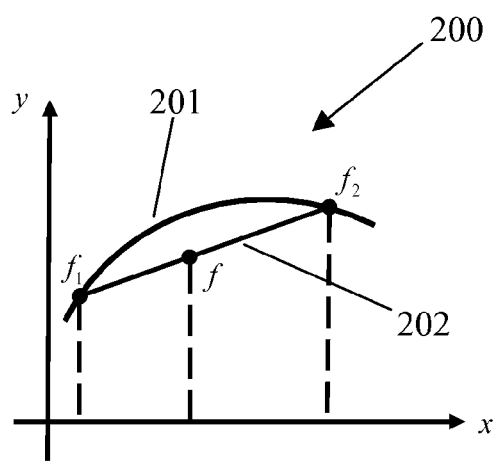
FIG. 2 shows a diagram of a convex set.

FIG. 2 shows a diagram 200 of a convex set to be used in an equation (1) to be described later. The diagram 200 includes an x axis labeled x and a y-axis labeled y. The diagram 200 includes a curve 201 representing a convex surface with arbitrary points $f_1$ and $f_2$ as marked on curve 201. The prior art diagram also includes a straight line 202 which joins $f_1$ and $f_2$. The arbitrary point f on the straight line 202 lies within the curve marked 201.

Figure 3:
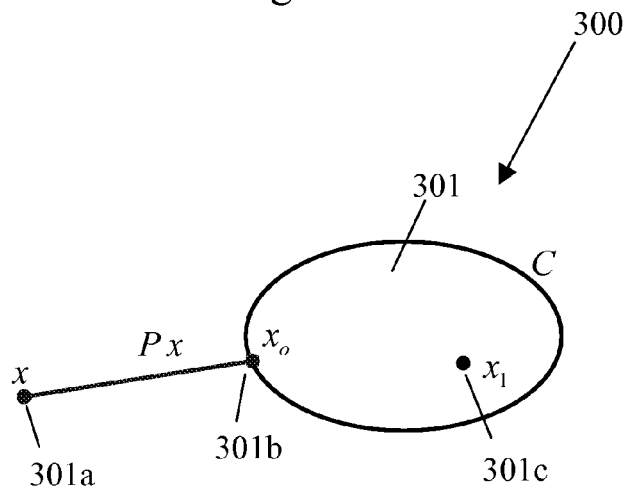
FIG. 3 shows a diagram of a "Unique" neighbor property.

FIG. 3 shows a diagram 300 of a "Unique" neighbor property used in an equation (4) to be described, for a projection operator such as in equations (6), (7), (8) or (9) associated with a convex set 301 (i.e. referring to elements within the region defined by closed curve or substantially elliptical shape C as shown here). The diagram 300 includes a point 301a, which represents an arbitrary point outside the convex set 301 and a point 301b, which represents its projection via the projection operator P of a signal at the point 301a onto the convex set 301. The projection Px represents the closest point within the convex set 301 to the point 301a, whose projection onto 301 is given by point 301b. Point 301c is a point within the convex set 301 or within the closed curve C. Points 301a, 301b, and 301c are also labeled x, $x_0$ and $x_1$, respectively.

Figure 4A:
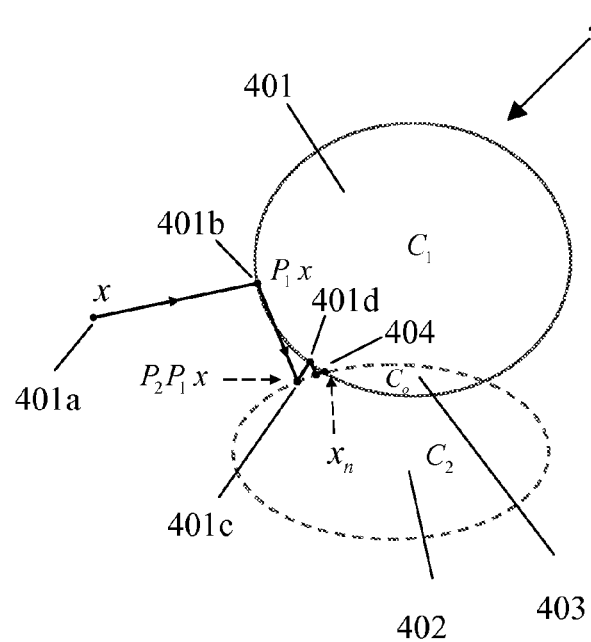
FIG. 4A shows a diagram of a method of iterative projections onto an intersection of two convex sets.

FIG. 4A shows a diagram 400 of a method of iterative projections such as used in equations (12), (13) and (14) to be described later, onto the intersection of two convex sets 401 and 402. The convex sets 401 and 402 are delimited by closed curves $C_1$ and $C_2$, respectively. The curve $C_2$ is shown by dashed lines. The diagram 400 includes points 401a, 401b, and 401c, which are also labeled x, $P_1 x$ and $P_2 P_1 x$, respectively. The diagram 400 also includes a convex set marked 403 that represents the intersection of convex sets $C_1$ and $C_2$ and a convergence point 404 marked $x_n$, that represents the end of iterations. The point 401a represents a starting point, the point 401b represents a projection onto the convex set 401 after one iteration, and the point 401c represents a subsequent projection onto the convex set 402. A "projection" from a starting point to a convex set, is a point within the convex set that is closest to the starting point. For example, a "projection" from the point 401a onto the convex set 401 is the point 401b, since the point 401b is the closest point to the point 401a, within the convex set 401, and no other point within the convex set 401 is closer to 401a than 401b.

Figure 4B:
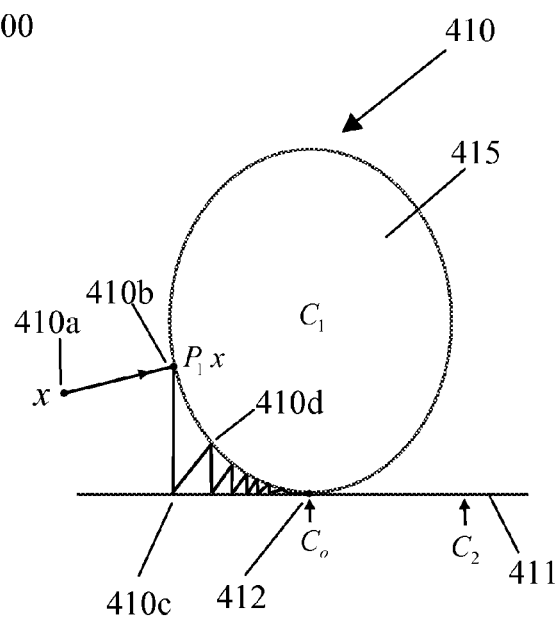
FIG. 4B shows a diagram of another example of iterative projections onto an intersection of two other convex sets that are different from those used in FIG. 4A.

FIG. 4B shows a diagram 410 (representing yet another situation that is different from FIG. 4A) of a method of iterative projections such as used in equations (12), (13) and (14) to be described later, onto the intersection of two convex sets 411 and 415, which are also labeled $C_2$ and $C_1$, and $C_0$ represents their intersection convex set marked 412. The convex set 411 is a straight line here, and the convex set $C_0$ consists of a single point marked 412. The diagram 410 shows points 410a, 410b, and 410c. The points 410a and 410b are also labeled x and $P_1x$. The point 410a represents a starting point; the point 410b is the projection onto convex set 415 after one iteration; the point 410c is the subsequent projection onto convex set 411; and the convergence point 412 represents the convergence point at the end of the iterations.

Figure 5:
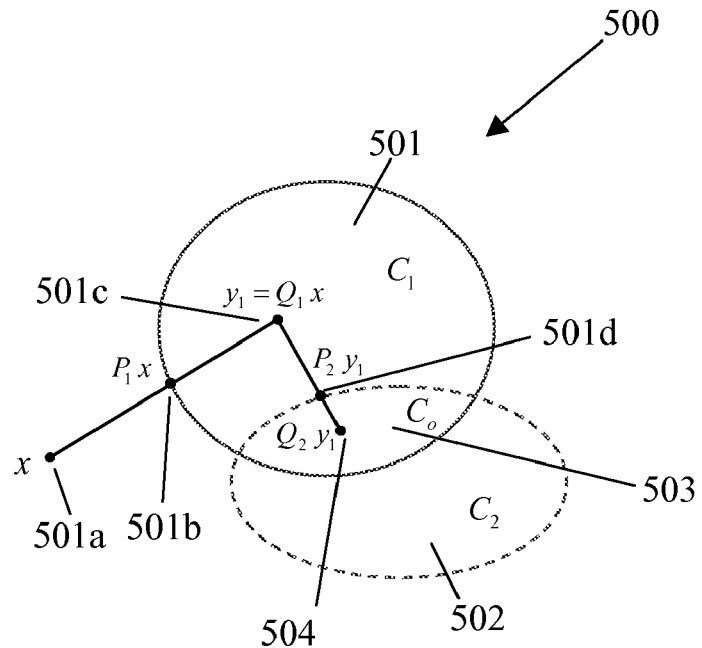
FIG. 5 shows a diagram of a relaxed projection method.

FIG. 5 shows a diagram 500 illustrating a relaxed projection method such as used as used in equations (15), (16) and (17) to be described later onto the intersection of two convex sets 501 and 502. The diagram 500 includes a point 501a which represents the starting point of an iteration. The diagram 500 also shows the intersection 503 of the two convex sets 501 and 502. A point 504 represents a signal at an end of one iteration. The points 501a and 504 are also labeled as x and $Q_2y_1$, respectively. The diagram 500 includes a point $y_1 = Q_1x$ marked 501c which is the relaxed projection of x marked 501a. A relaxed projection operator extends the ordinary projection point to an interior point such as 501c that is within the convex set. Also shown are $P_1x$ marked 501b that represents the projection of 501a to the convex set 501, and $P_2y_1$ marked 501d that represents the projection of 501c to the convex set 502. Thus, starting at 501a, an ordinary projection operation results in point 501b, whereas a relaxed projection operator generates an interior point 501c.

The values of the variables or sets x, $P_1x$, $c_2$, $c_1$ and $C_0$ of FIG. 4A, the values of the correspondingly named variables or sets x, $P_1x$, $c_2$, $c_1$ and $C_0$ of FIG. 4B, and the values of the correspondingly named variables or sets x, $P_1x$, $c_2$, $c_1$ and $C_0$ of FIG. 5 are typically different from each other. For example, $c_2$ of FIG. 4A is typically different from $c_2$ of FIG. 4B.

Figure 6:
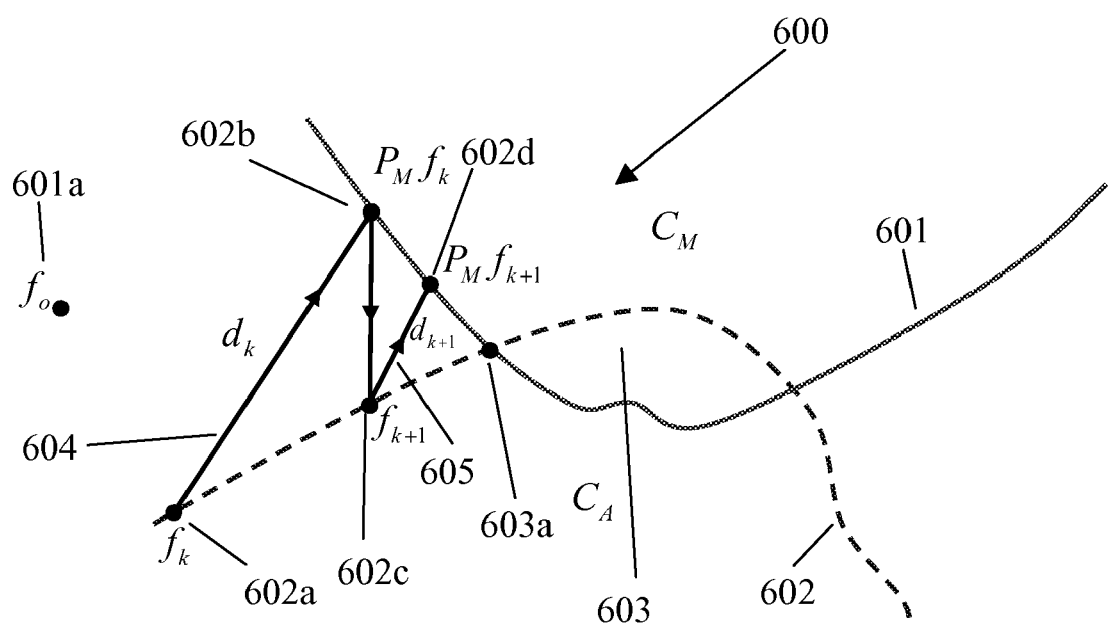
FIG. 6 shows a diagram of the error reduction property.

FIG. 6 shows a graph 600 illustrating an error reduction property such as in equations (41) or (42), to be described later, for the iterative method in accordance with an embodiment of the present invention such as in equations (37) or (39) using a magnitude substitution operator in equation (25) and the constant envelope substitution operation in equation (36) for two convex-like sets 601 and 602 (shown in dashed lines), with 603 representing their intersection. The prior art graph 600 includes a point 601a, also labeled as $f_0$, which represents a starting point of an iteration. A point 602a, also labeled $f_k$, represents a constant envelope signal after k-steps of an iteration at stage 808 shown in FIG. 8, and a point 602b marked $P_M f_k$ represents a reconstructed signal at a stage 807 or 808 shown in FIG. 8 after k-steps of an iteration. The point 602c also labeled $f_{k+1}$, marks the beginning of the (k+1) step of the iteration, and the point marked 602d labeled $P_M f_{k+1}$ represents a reconstructed signal at a stage 808 shown in FIG. 8 after (k+1)-steps of an iteration. The graph 600 includes lines 604 marked $d_k$ and 605 marked $d_{k+1}$ which represent an error function in equation (41) after k-steps and (k+1) steps respectively of an iteration, to be described later.

Figure 7:
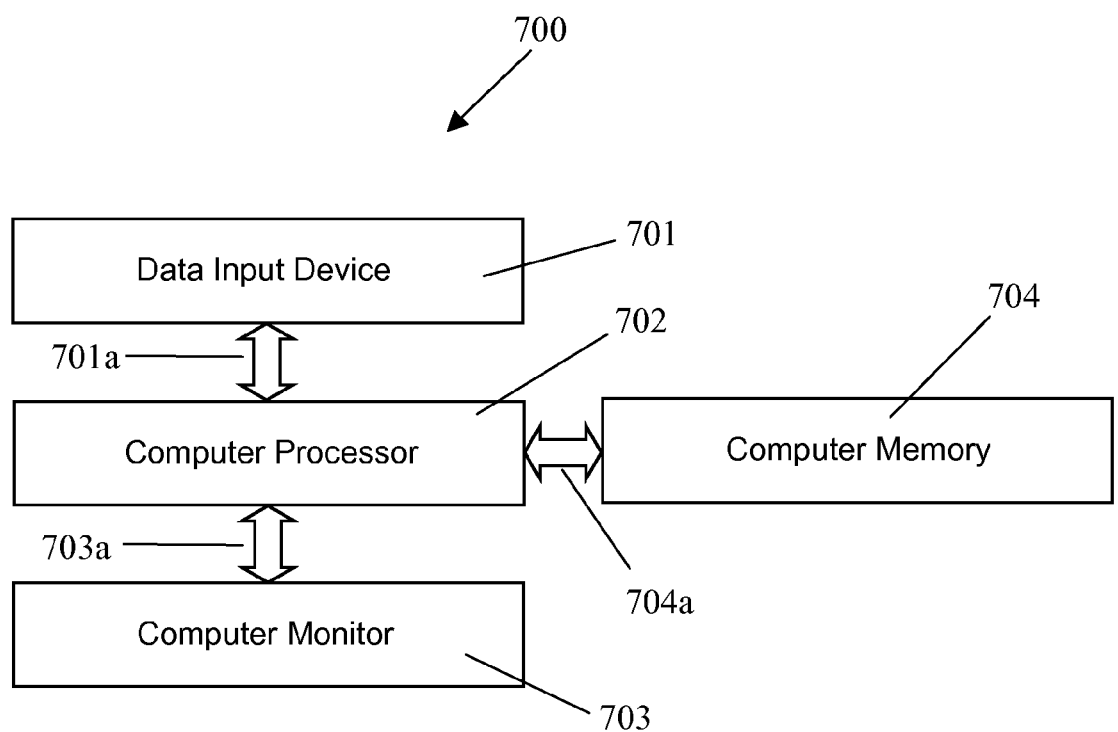
FIG. 7 shows an apparatus for use with an embodiment of the present invention.

FIG. 7 shows an apparatus 700 for use in accordance with an embodiment of the present invention. The apparatus 700 includes a data input device 701, a computer processor 702, a computer monitor or display 703, and a computer memory 704. The data input device 701, the computer monitor 703, and the computer memory 704 are connected to and/or communicate with the computer processor 702 by communication links 701a, 703a, and 704a, respectively. The data input device 701 may include an antenna and receiver. The computer processor 702 may be programmed by computer software to execute various steps, functions, or stages, to be described.

Figure 8:
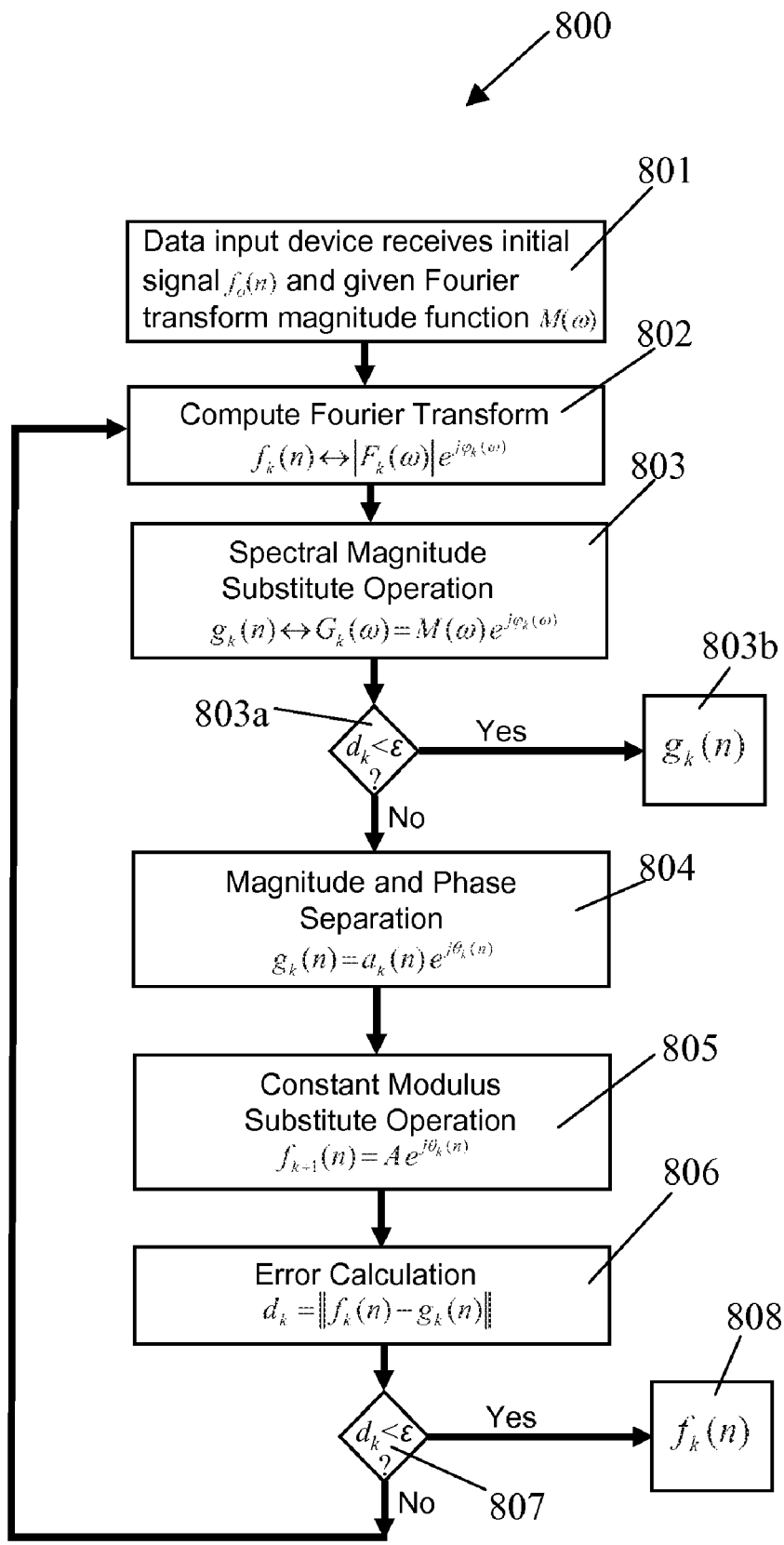
FIG. 8 shows a flow chart of a method for using the apparatus of FIG. 7 in accordance with an embodiment of the present invention.

FIG. 8 shows a flow chart 800 of a method of use of the apparatus 700 in accordance with an embodiment of the present invention. At step 801 the data input device 701 receives a given Fourier transform magnitude function $|F(\omega)| = M(\omega)$. The given Fourier transform magnitude function $M(\omega)$ may be the same as the function represented by curve 10 in FIG. 1A. The data input device 701 may also receive a first signal $f_0(n)$ at step 801. A variable k may be initialized to 0 and a variable n may be initialized to 1 at step 801 in the computer memory 704 by the computer processor 702, which may implement this step or stage 801 and other steps or stages by a computer program or software running on the computer processor 702. The first signal $f_0(n)$ may correspond to the signal shown by curve 101 in FIG. 1B.

At step 802, the data input device 701 supplies a given Fourier Transform magnitude function $M(\omega)$ and the first signal $f_0(n)$ to the computer processor 702. The given Fourier Transform magnitude function $M(\omega)$ in this embodiment, is not the Fourier Transform magnitude of the first signal $f_0(n)$. The computer processor 702 accepts the first signal $f_0(n)$ from the input device 701 at the beginning of a first iteration and computes a first computed Fourier transform of the first signal $f_0(n)$. Each iteration may be comprised of steps 802, 803a, 804, 805, 806, and 807. An iteration stops if the condition specified at 803a or 807 is satisfied. The first computed Fourier transform function of the first signal $f_0(n)$ does not have magnitude function corresponding to the given Fourier Transform magnitude function $M(\omega)$. In general at stage k the above Fourier transform operation is represented by $f_k(n) = |F_k(\omega)|e^{j\Phi_k(\omega)}$, where $f_k(n)$ refers to a first modified signal. The computer processor 702 may store the first signal $f_0(n)$, the first computed Fourier transform function, or the given Fourier transform magnitude function in computer memory 704 or may display the first signal $f_0(n)$, the first computed Fourier transform function, or the given Fourier transform magnitude function on the computer monitor 703.

At step 803, the computer processor 702 replaces the magnitude function $|F_k(\omega)|$ of the first computed Fourier transform function with the given Fourier transform magnitude function $M(\omega)$ such as shown in FIG. 1A, to form a modified Fourier transform function $G_k(\omega)$, and this may be stored in the computer memory 704. The computer processor 702 then computes the inverse Fourier transform of the first modified Fourier transform function at step 803 to generate a second modified signal $g_k(n)$ using the relation $g_k(n) \leftrightarrow G_k(\omega) = M(\omega)e^{j\Phi_k(\omega)}$, and this may be stored in the computer memory 704 by the computer processor 702.

At step 804 the computer processor 702 rewrites the signal $g_k(n)$ in the time domain in terms of its magnitude and phase using the equation $g_k(n) = a_k(n)e^{j\Theta_k(n)}$, and at step 805 the above magnitude of the signal $g_k(n)$ in the time domain is replaced with a suitable constant A to form a revised first modified signal $f_{k+1}(n)$ as in $f_{k+1}(n) = Ae^{j\Theta_k(n)}$ The rewritten or first modified signal for $g_k(n)$ and the revised first modified signal, and any intermediate signals may be stored in the computer memory 704 by the computer processor 702.

After step 807 has been completed, meaning an iteration has been completed, and assuming that the error in step 807 is not less than a prescribed value to be described, the computer processor 702 increments k to (k+1) in computer memory 704, and the takes the new signal $f_{k+1}(n)$ and loops it back to step 802. Thus the revised first modified signal for stage k becomes the first modified signal for the next stage (k+1).

At step 806, an error function $d_k$ is computed using the formula $d_k = \|f_k(n) - g_k(n)\|$ that represents the energy of the error signal $f_k(n) - g_k(n)$, and is used in step 807 by the computer processor 702 as stopping rules for stopping the iteration process. In step 803a, the computer processor 702 determines if the last computed error at the k-th iteration (which is $d_k$) is less than a prescribed value $\epsilon$, and if so then the iteration stops and the output at step 803b is used as the desired signal $g_k(n)$, such as by storing the signal $g_k(n)$ in the computer memory 704, outputting and/or displaying the signal $g_k(n)$ on the computer monitor 703 or transmitting the signal out via a transmitter not shown. The time domain output $g_k(n)$ at step 803b has the given Fourier transform magnitude function $M(\omega)$ and its time-domain envelope is approximately constant such as shown by curve or function 941 and 951 in FIG. 9E and FIG. 9F, respectively. In step 807 if the computed error at k-th iteration (which is $d_k$ after it has been calculated at step 806) is less than a prescribed value $\epsilon$, then the iteration stops and the output $f_k(n)$ at step 808 is used as the desired signal. The computed Fourier transform magnitude function of the output $f_k(n)$ at step 808 approximately matches the given Fourier transform magnitude function $M(\omega)$ and the output at step 808 has an exact constant envelope in the time domain such as shown by curve or function 921 and 931 of FIG. 9C and FIG. 9D, respectively. Each of $f_k(n)$ which may be called the first modified time signal and $g_k(n)$, which may be called the second modified time signal may be transmitted out from a transmitter as part of a radar transmit waveform or as part of a communication transmission scheme. $f_{k+1}(n)$ may be called a revised first modified time signal.

Figure 9A:
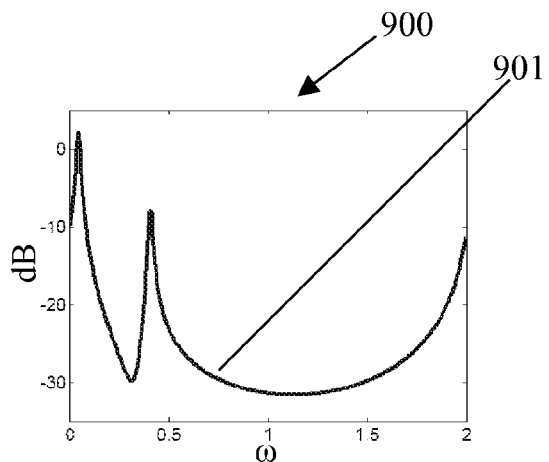
FIG. 9A shows a diagram of a second given Fourier transform magnitude function $M(\omega)$ in the frequency domain.

FIG. 9A shows a diagram 900 of a given Fourier transform magnitude function $M(\omega)$, shown by curve 901, in the frequency domain. The diagram 900 shows dB (decibels) on a y axis versus frequency $\omega$ on an x axis.

Figure 9B:
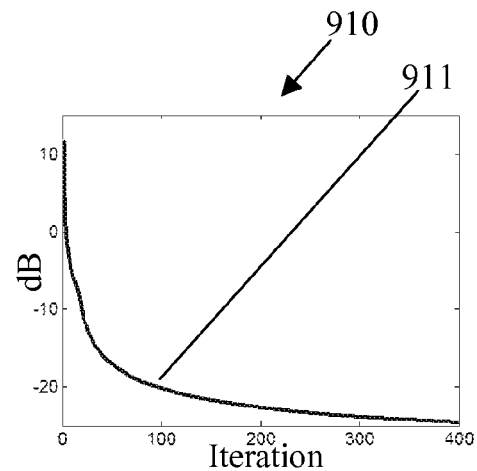
FIG. 9B shows a diagram of an error in dB as a function of a number of iterations up to four hundred iterations.

FIG. 9B shows a diagram 910 of error (i.e. $d_k$ referred to in step or stage 806 of FIG. 8) in dB as a function of the number of iterations (where each iteration includes steps 802, 803, 803a, 804, 805, 806, and 807), shown by curve 911, up to four hundred iterations using the apparatus 700 in FIG. 7 and the method shown by flow chart 800 in FIG. 8. The diagram 910 shows dB (decibels) on a y axis versus iterations (each iteration comprised of steps 802, 803, 803a, 804, 805, 806, and 807 of method shown in FIG. 8) on an x axis.

Figure 9C:
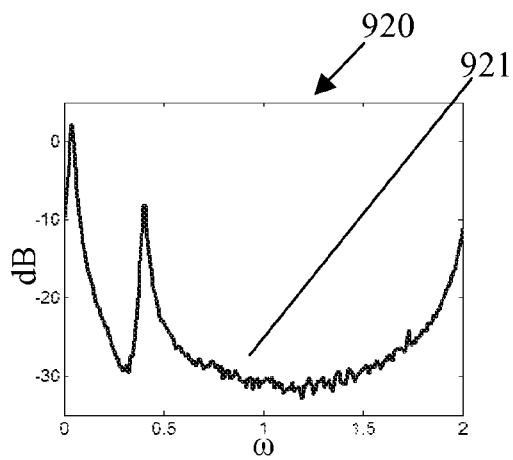
FIG. 9C shows a diagram of a computed Fourier transform magnitude function in the frequency domain of the signal $f_k$ at the end of a four hundredth iteration computed using the second given Fourier transform magnitude function shown in FIG. 9A and its minimum phase signal as the starting point.

FIG. 9C shows a diagram 920 of a computed Fourier transform magnitude function in the frequency domain (represented by curve 921) of $f_k(n)$ at the end of a four hundredth iteration (k=400) at step 808 in FIG. 8 using the apparatus 700 starting with a given Fourier transform magnitude function $M(\omega)$ as shown in FIG. 9A and its corresponding minimum phase signal as the input. The diagram 920 shows dB (decibels) on a y axis versus frequency $\omega$ on an x axis.

Figure 9D:
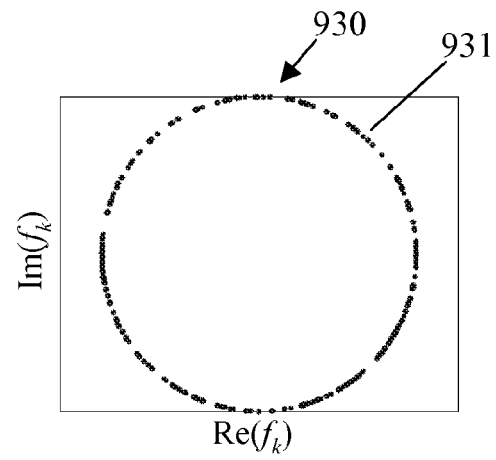
FIG. 9D shows a diagram of the real and imaginary parts of $f_k$ in the time domain signal at the end of a four hundredth iteration computed using the second given Fourier transform magnitude shown in FIG. 9A and its minimum phase signal as the starting point.

FIG. 9D shows a diagram 930 of the real and imaginary parts of $f_k(n)$, shown by plot 931, in the time domain signal at the end of four hundredth iteration at step 808 in FIG. 8 using the apparatus 700 with a given Fourier transform magnitude function $M(\omega)$ as shown in FIG. 9A and its corresponding minimum phase signal as the input. The diagram 930 shows an imaginary part of $f_k$ on a y axis versus a real part of $f_k$ on an x axis. The plot 931 is comprised of a plurality of points each of which has imaginary (y axis) and real (x axis) coordinates and each point there refers to a temporal point in the time domain.

Figure 9E:
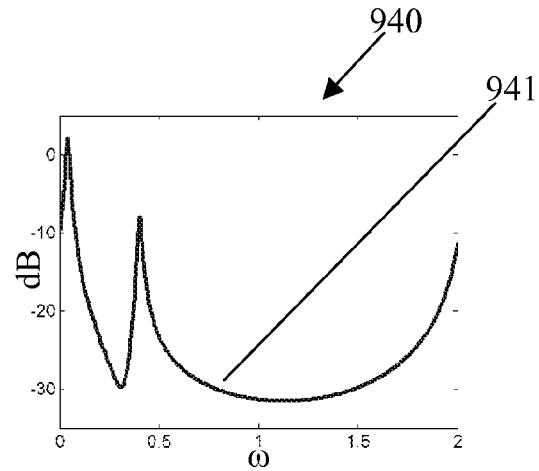
FIG. 9E shows a diagram of a computed Fourier transform magnitude function in the frequency domain of the signal $g_k$ at the end of a four hundredth iteration computed using the second given Fourier transform magnitude function shown in FIG. 9A and its minimum phase signal as the starting point.

FIG. 9E shows a diagram 940 of a given Fourier transform magnitude function in the frequency domain of $g_k(n)$, shown by curve 941, (which is also the same as the given Fourier transform magnitude function $M(\omega)$ as shown in FIG. 9A) at the end of a four hundredth iteration (each iteration through the loop comprised of steps 802, 803, 803a, 804, 805, 806, and 807, except for the last iteration (which does not include steps 804-807, since the last iteration ends by branching to step 803b if the error does not exceed threshold $\epsilon$ at step 803a) in FIG. 8) at step 803b in FIG. 8 using the apparatus 700 with the given Fourier transform magnitude shown by FIG. 9A as the input. The diagram 940 shows dB (decibels) on a y axis versus frequency $\omega$ on an x axis.

Figure 9F:
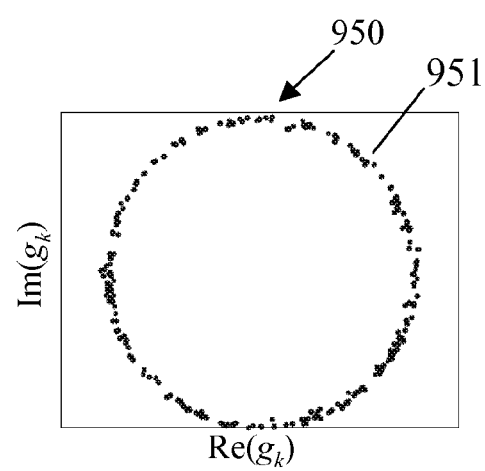
FIG. 9F shows a diagram of the real and imaginary parts of $g_k$ in the time domain at the end of a four hundredth iteration computed using the second given Fourier transform magnitude shown in FIG. 9A and its minimum phase signal as the starting point.

FIG. 9F shows a diagram 950 of the real and imaginary parts of $g_k(n)$, shown by plot 951, in the time domain at the end of a four hundredth iteration at step 803b (where last "iteration" is a shortened one not including steps 804, 805, 806, and 807) in FIG. 8 using the computer processor 702 and the apparatus 700 in FIG. 7, the method shown by flow chart 800 of FIG. 8, starting with the given Fourier transform magnitude function shown by FIG. 9A as the input. The diagram 950 shows an imaginary part of $g_k$ on a y axis versus a real part of $g_k$ on an x axis. The plot 951 is comprised of a plurality of points each of which has imaginary (y axis) and real (x axis) coordinates and each point there refers to a temporal point in the time domain.

Figure 10A:
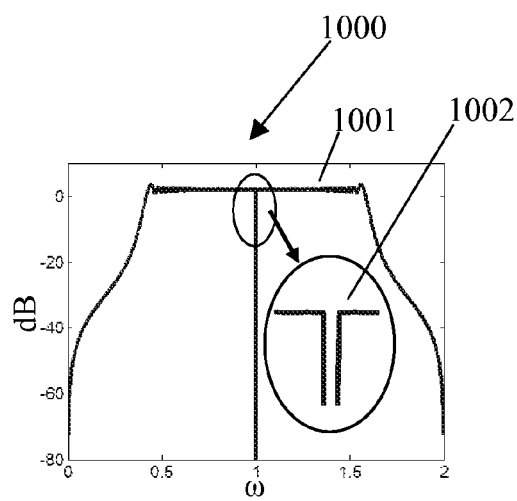
FIG. 10A shows a diagram of a third given Fourier transform magnitude function with a flat spectrum and a notch in the frequency domain.

FIG. 10A shows a diagram 1000 of a given Fourier transform magnitude function $M(\omega)$, shown as curve 1001, with flat spectrum and a notch 1002 shown in a magnified view in the frequency domain. The diagram 1000 shows dB (decibels) on a y axis versus frequency $\omega$ on an x axis.

Figure 10B:
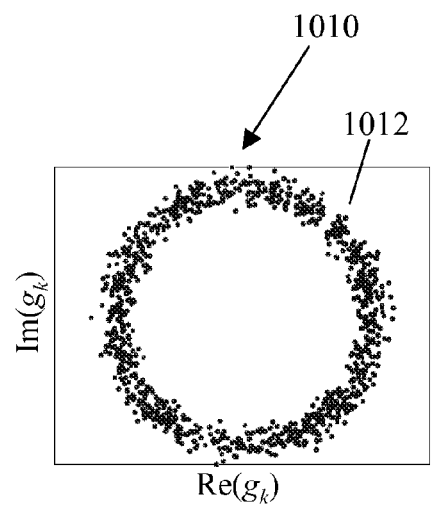
FIG. 10B shows a diagram of the real and imaginary parts of $g_k$ in the time domain at the end of four hundredth iteration computed using the third given Fourier transform magnitude function of FIG. 10A and its minimum phase signal as the starting point.

FIG. 10B shows a diagram 1010 of the real and imaginary parts of $g_k(n)$, shown as plot 1012, in the time domain at the end of four hundredth iteration at step 803b in FIG. 8 using the computer processor 702 and the apparatus 700 with the given Fourier transform magnitude $M(\omega)$ shown in FIG. 10A and its minimum phase signal as the input. The diagram 1010 shows an imaginary part of $g_k$ on a y axis versus a real part of $g_k$ on an x axis. The plot 1012 is comprised of a plurality of points each of which has imaginary (y axis) and real (x axis) coordinates and each point there refers to a temporal point in the time domain.

Figure 10C:
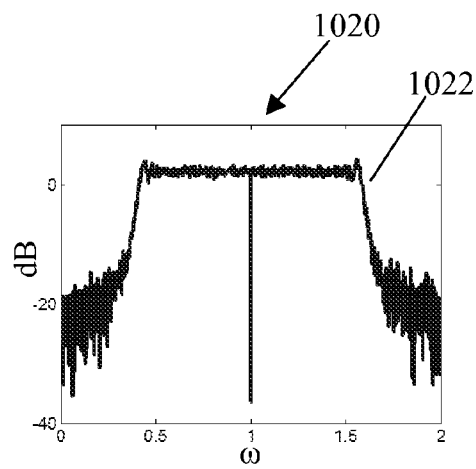
FIG. 10C shows a diagram of a computed Fourier transform magnitude function in the frequency domain of the signal $f_k$ at the end of four hundredth iteration computed using the third given Fourier transform magnitude function of FIG. 10A and its minimum phase signal as the starting point.

FIG. 10C shows a diagram 1020 of the computed Fourier transform magnitude function in the frequency domain of $f_k(n)$, shown by curve 1022, at the end of a four hundredth iteration at step 808 in FIG. 8 using the computer processor 702 and the apparatus 700 with the given Fourier transform magnitude $M(\omega)$ shown in FIG. 10A and its minimum phase signal as the input. The diagram 1020 shows dB (decibels) on a y axis versus frequency $\omega$ on an x axis.

Figure 10D:
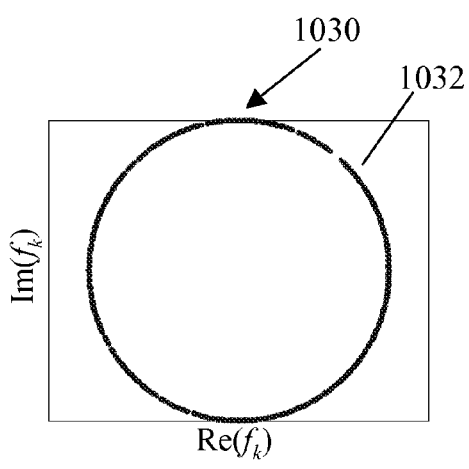
FIG. 10D shows a diagram of the real and imaginary parts of $f_k$ in the time domain signal at the end of 400-th iteration computed using the third given Fourier transform magnitude function of FIG. 10A and its minimum phase signal as the starting point.

FIG. 10D shows a diagram 1030 of the real and imaginary parts of $f_k(n)$ in the time domain signal, shown by curve 1032, at the end of a four hundredth iteration at step 808 in FIG. 8 using the apparatus 700 with the given Fourier transform magnitude function $M(\omega)$ shown in FIG. 10A and its minimum phase signal as the input. The diagram 1030 shows an imaginary part of $f_k$ on a y axis versus a real part of $f_k$ on an x axis. The plot 1032 is comprised of a plurality of points each of which has imaginary (y axis) and real (x axis) coordinates and each point there refers to a temporal point in the time domain.

Figure 11A:
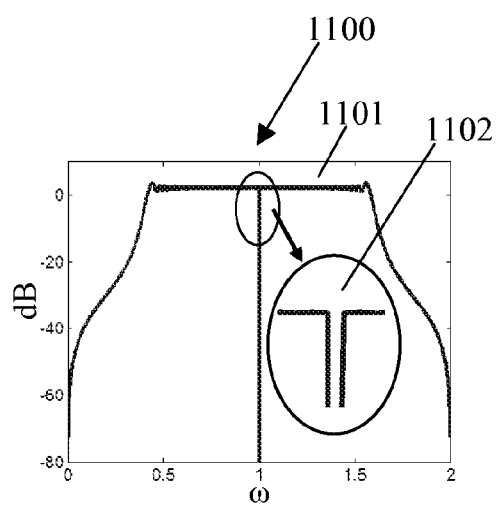
FIG. 11A shows a diagram of the third given Fourier transform magnitude function with a flat spectrum and a notch in the frequency domain (same as FIG. 10A)

FIG. 11A shows a diagram 1100 (same as FIG. 10A) of a given Fourier transform magnitude function $M(\omega)$, shown as curve 1101, with flat spectrum and a notch shown magnified as 1102 in the frequency domain. The diagram 1100 shows dB (decibels) on a y axis versus frequency $\omega$ on an x axis.

Figure 11B:
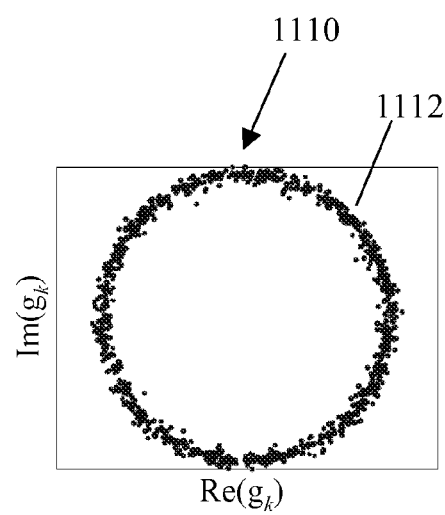
FIG. 11B shows a diagram of the real and imaginary parts of $g_k$ in the time domain at the end of four hundredth iteration computed using the third given Fourier transform magnitude of FIG. 11A and a chirp signal as the starting point.

FIG. 11B shows a diagram 1110 of the real and imaginary parts of $g_k(n)$, shown by the curve 1112 in the time domain at the end of the four hundredth iteration at step 803b in FIG. 8 using the apparatus 700 with the given Fourier transform magnitude function $M(\omega)$ shown in FIG. 11A and a standard chirp signal as the input. The diagram 1110 shows an imaginary part of $g_k$ on a y axis versus a real part of $g_k$ on an x axis. The plot 1112 is comprised of a plurality of points each of which has imaginary (y axis) and real (x axis) coordinates each point there refers to a temporal point in the time domain.

Figure 11C:
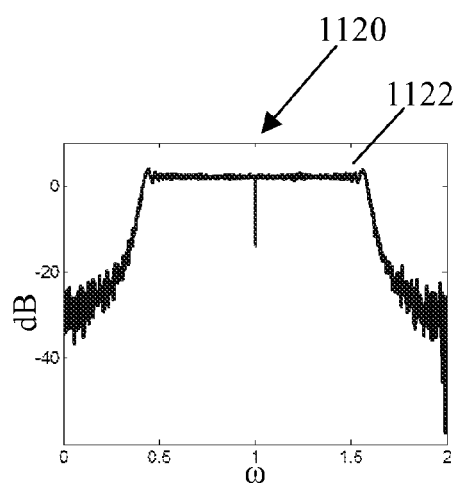
FIG. 11C shows a diagram of a Fourier transform magnitude function in the frequency domain of $f_k$ at the end of four hundredth iteration computed using the third given Fourier transform magnitude of FIG. 11A and a chirp signal as the starting point.

FIG. 11C shows a diagram 1120 of the computed Fourier transform magnitude function in the frequency domain of $f_k(n)$, show by the curve 1112, at the end of 400-th iteration at step 808 in FIG. 8 using the computer processor 702 the apparatus 700 with the given Fourier transform magnitude function $M(\omega)$ shown in FIG. 11A and a chirp signal signal as the input. The diagram 1120 shows dB (decibels) on a y axis versus frequency $\omega$ on an x axis.

Figure 11D:
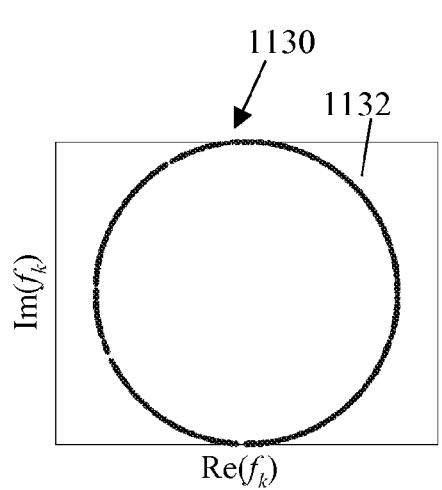
FIG. 11D shows a diagram of the real and imaginary parts of $f_k$ in the time domain signal at the end of 400-th iteration using the third given Fourier transform magnitude of FIG. 11A and a chirp signal.

FIG. 11D shows a diagram 1130 of the real and imaginary parts of $f_k(n)$ in the time domain signal at the end of four hundredth iteration at 808 in FIG. 8 using the apparatus 700 with the given Fourier transform magnitude function $M(\omega)$ shown in FIG. 11A and a chirp signal as the input. The diagram 1130 shows an imaginary part of $f_k$ on a y axis versus a real part of $f_k$ on an x axis.

Figure 12A:
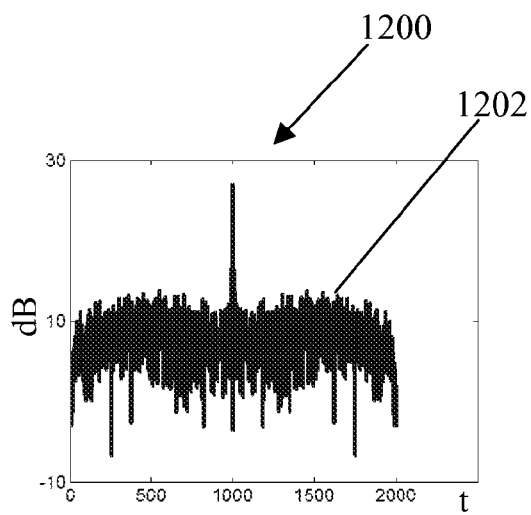
FIG. 12A shows a diagram of a matched filter output corresponding to the time signal in FIG. 10B.

FIG. 12A shows a diagram 1200 of a matched filter output, shown by curve 1202, corresponding to the time signal $g_k(n)$ in FIG. 10B. The diagram 1200 shows dB (decibels) on a y axis versus time t on an x axis.

Figure 12B:
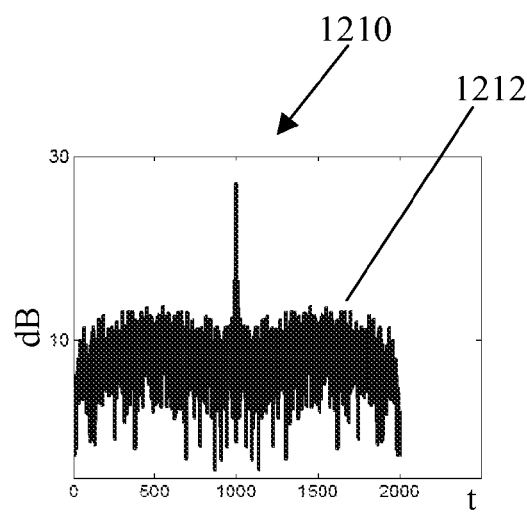
FIG. 12B shows a diagram of a matched filter output corresponding to the time signal in FIG. 10D.

FIG. 12B shows a diagram 1210 of a matched filter output, shown by curve 1212, corresponding to the time signal $f_k(n)$ in FIG. 10D. The diagram 1210 shows dB (decibels) on a y axis versus t on an x axis.

Figure 12C:
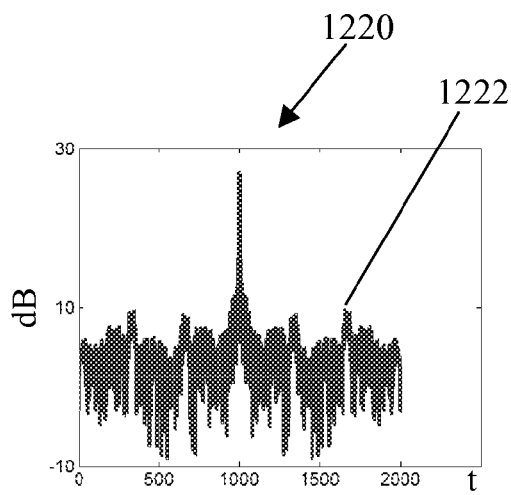
FIG. 12C shows a diagram of a matched filter output corresponding to the time signal in FIG. 11B.

FIG. 12C shows a diagram 1220 of a matched filter output, shown by curve 1222, corresponding to the time signal $g_k(n)$ in FIG. 11B. The diagram 1220 shows dB (decibels) on a y axis versus t on an x axis.

Figure 12D:
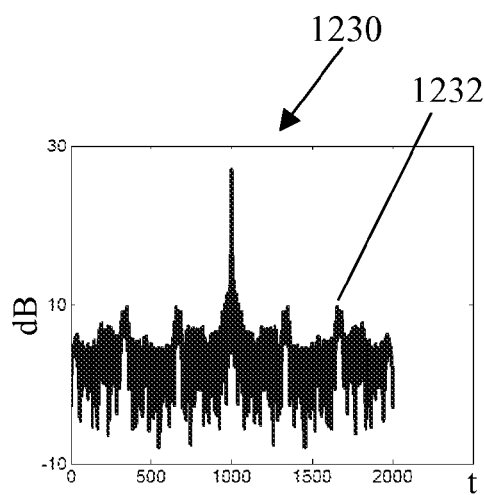
FIG. 12D shows a diagram of a matched filter output corresponding to the time signal in FIG. 11D.

FIG. 12D shows a diagram 1230 of a matched filter output, shown by curve 1232, corresponding to the time signal $f_k(n)$ in FIG. 11D. The diagram 1230 shows dB (decibels) on a y axis versus t on an x axis.

The following refers to a method of alternating projections in accordance with a prior art method.

Consider the closed convex sets $C_1, C_2, \ldots C_n$ and their associated projection operators $P_1, P_2 \ldots P_n$. If the desired function belongs to each closed convex set $C_1$, then it belongs to their intersection $$C_o = C_1 \cap C_2 \cap \ldots C_n. \tag{12}$$

Starting from an outside point x (usually an approximant), the problem is to determine its "nearest neighbor" $x_o$ within the derived convex set $C_o$; if not at least a point within $C_o$. If the projection operator $P_o$ corresponding to the new convex set $C_o$ is known, then that nearest neighbor to x equals $x_o = P_o x$ as in equation (4). However, $P_o$ is usually unknown, since $C_o$ is defined only through equation (12), and in general only $P_1, P_2 \ldots P_n$ are known. Thus the problem reduces to finding a neighbor (not necessarily the nearest) in $C_o$ starting at x given $P_1, P_2 \ldots P_n$ [D. C. Youla, "Generalized Image Restoration by the Method of Alternating Projections", IEEE Transactions on Circuits and Systems, Vol. 25, pp. 694-702, September 1978], [L. G. Gubin, B. T. Polyak, and E. V. Raik, "The Method of Projections for Finding the Common Point of Convex Sets", U.S.S.R. Computational Mathematics and Mathematical Physics, Vol. 7, No. 6, pp. 1-24, 1967], [Z. Opial, "Weak Convergence of the Sequence of Successive Approximations for Nonexpansive Mappings", Bull. Amer. Soc. Vol. 73, pp. 591-597, 1967].

The method of alternating projections originally proposed by John Neumann [J. V. Neumann, "Functional Operators, Vol. II", Annals of Mathematics Studies, No. 22, Theorem 13.7, p. 55, Princeton, N.J., 1950] has been generalized to address this problem [D. C. Youla, "Mathematical Theory of image Restoration by the Method of Convex projections," Chapter 2, Theorem 2.4-1, in Image Recovery: Theory and Application edited by H. Stark, pages 29-77, Academic press, Inc., New York]. Define the alternating projection operator $$P = P_n P_{n-1} \ldots P_2 P_1 \tag{13}$$

and consider the iteration $$x_i = P x_{i-1}, i=1, 2, \tag{14}$$

Starting with $x_o = x$. Then it has been shown that the iteration in equation (14) converges weakly to a point in the interest $C_o$ in equation (12) [D. C. Youla, "Mathematical Theory of image Restoration by the Method of Convex projections," Chapter 2, Theorem 2.4-1, in Image Recovery: Theory and Application edited by H. Stark, pages 29-77, Academic press, Inc., New York], [L. G. Gubin, B. T. Polyak, and E. V. Raik, "The Method of Projections for Finding the Common Point of Convex Sets", U.S.S.R. Computational Mathematics and Mathematical Physics, Vol. 7, No. 6, pp. 1-24, 1967], [Z. Opial, "Weak Convergence of the Sequence of Successive Approximations for Nonexpansive Mappings", Bull. Amer. Soc. Vol. 73, pp. 591-597, 1967]. Recall that a sequence $\{f_n\}$ converges to f if $$\lim_{k \to \infty} \|f_k - f\| = 0,$$

and it is said to converge weakly to f if $$\lim_{k \to \infty} (f_k, g) = (f, g)$$

for every g in the vector space, where (x,y) denotes the inner product of x and y. This is illustrated in FIG. 4A and FIG. 4B for two different convex sets.

The iterations in equation (14) can be accelerated in their convergence rate by making use of the relaxed projection operators as shown below.

The following refers to "relaxed projection operators" in accordance with a prior art method:

The projection operators $P_k$ can be "relaxed" to generate $$Q_k = I + \lambda_k (P_k - I), k=1, 2, \ldots n \tag{15}$$

that are non-expansive operators for $0 \leq \lambda_k \leq 2$, with I representing the identity operator. If T is a non-expansive operator, then $\|Tx - Ty\| \leq \|x - y\|$. If on the other hand $\|Tx - Ty\| < \|x - y\|$ then T represents a contraction (strict inequality). The quantity $\lambda_k$ in equation (15) represents the relaxation parameter and it can be chosen to form a sequence of adaptive coefficients for faster convergence as in FIG. 5. Notice that the freedom in the selection of $\lambda_k$ allows the projection point 501b to move inside the convex set to 501c.

Thus, relaxed projection operators can be substituted in equation (14) and by controlling $\lambda_k$'s, the convergence rate can be controlled as well. Thus more generally with $Q_k$ as in (15) and with $$Q = Q_n Q_{n-1} \ldots Q_2 Q_1, \tag{16}$$

the iteration $$x_1 = Q x_{i-1}, i=1, 2, \tag{17}$$

converges weakly to a point in the intersection C in equation (11).

Fourier Transform Magnitude:

Although signals with the same Fourier transform phase do form a closed convex set as seen in equation (10), signals with the same Fourier transform magnitude function do not form a convex set. This follows easily since if $$f_1(t) \longleftrightarrow M(\omega) e^{j\psi_1(\omega)}, f_2(t) \longleftrightarrow M(\omega)^{j\psi_2(\omega)} \tag{18}$$

then for any $0<\alpha<1$ we get (use equation (1))

$$f(t)=\alpha f_1(t)+(1-\alpha)f_2(t) \leftrightarrow M(\omega)(e^{j\psi_1(\omega)}+ (1-\alpha)e^{j\psi_2(\omega)})= M(\omega)A(\omega)e^{j\psi(\omega)}. \quad (19)$$

Since the convex combination above has its transform magnitude equal to $M(\omega)A(\omega)\neq M(\omega)$, it does not preserve the original magnitude function $M(\omega)$. As a result, signals with the same Fourier transform magnitude functions over a prescribed frequency region do not form a convex set and there exists no corresponding projection operator.

Let $C_M$ denote the "convex-like" set of functions $\{g(t)\}$ that have the prescribed Fourier transform magnitude $M(\omega)$ over a prescribed frequency set $\omega$. Although $C_M$ is not a closed convex set, it is nevertheless possible to define an operator $P_M$ that will assign to every arbitrary function $f(t)$ a "nearest neighbor" $P_M f(t)$ that belongs to $C_M$ such that there exists no other element $g \in C_M$ for which $$\|f-g\|<\|f-P_M f\| \quad (20)$$

is satisfied. In the case of closed convex sets the above operator is the projection operator and the "nearest neighbor" is unique as in equation (3). In the case of the magnitude substitution operator(convex-like set), the uniqueness is not preserved and in general we only have $$\|f-P_m f\|\leq \|f-g\|, \text{ for all } g \in C_M. \quad (21)$$

Given an arbitrary $f(t)$, to determine $P_M f(t)$, with the prescribed Fourier transform magnitude $M(\omega)$ we need $g(t) \in C_M$ such that $\|f(t)-g(t)\|^2$ is minimum over $\Omega$. With $$f(t) \leftrightarrow F(\omega))=|F(\omega)|e^{j\psi(\omega)}, g(t) \leftrightarrow G(\omega)=M(\omega)e^{j\phi(\omega)} \quad (22)$$

we have $$\|f(t)-g(t)\|^2 = \frac{1}{2\pi}\int_{-\infty}^{+\infty}|F(\omega)-G(\omega)|^2 d\omega \quad (23)$$

$$= \frac{1}{2\pi}\int_{\Omega}|F(\omega)-G(\omega)|^2 d\omega +$$

$$\frac{1}{2\pi}\int_{\Omega'}|F(\omega)-G(\omega)|^2 d\omega$$

where $\Omega'$ denotes the complementary set of the prescribed frequency set $\Omega$. To minimize (23), we set the unknown $G(\omega)=F(\omega)$ for $\omega \in \Omega$ so that (23) reduces to $$2\pi\|f(t)-g(t)\|^2 = \int_{\Omega}|F(\omega)-G(\omega)|^2 d\omega \quad (24)$$

$$= \int_{\Omega}|F(\omega)|^2 d\omega + \int_{\Omega}|M(\omega)|^2 d\omega -$$

$$2\int_{\Omega}|F(\omega)|M(\omega)\cos(\psi(\omega)-\phi(\omega))d\omega$$

and the right side is minimized by selecting the free phase function $\phi(\omega)$ equal to $\psi(\omega)$ so that $\cos(\psi(\omega)-\phi(\omega))=1$ for all $\omega \in \Omega$. Hence for any $f(t) \leftrightarrow F(\omega)=|F(\omega)|e^{j\psi(\omega)}$, $$P_M f(t) = \begin{cases} M(\omega)e^{j\psi(\omega)}, & \omega \in \Omega \\ F(\omega), & \omega \in \Omega' \end{cases} \quad (25)$$

gives the magnitude substitution operator. Using the operator $P_M$ we can define the "alternating" iteration $$f_{k+1}=PP_M f_k \quad (26)$$

where P represents any one of the projection operators discussed earlier ($P_B$, $P_C$, $P_+$, $P_T$ etc). Although iteration (26) is not shown to be convergent, it possesses the following "error reduction" property [A. Levi and H. Stark, "Image Restoration by the Method of Generalized Projections with Applications to Restoration from Magnitude," IEEE International Conference on Acoustics, Speech and Signal Processing, ICASSP'84, pages 88-91, March 1984]

$$\sigma_{k+1}=\|f_{k+1}-P_M f_{k+1}\|\leq \|f_k-P_M f_k\|=\sigma_k. \quad (27)$$

This follows by observing that by the definition of $P_M$ in (21) we have (with $g=P_M f_k \in C_M$)

$$\|f_{k+1}-P_M f_{k+1}\|\leq \|f_{k+1}-P_M f_k\|=\|PP_M f_k-P_M f_k\|, \quad (28)$$

where the last equality follows from (26). But $PP_M f_k=Px$ is the projection of $x=P_M f_k$ onto a closest convex set C and from (26) since $f_k=PP_M f_{k-1}$ is also in that convext set, using (2), we obtain (with $x_o=PP_M f_k$, $x=P_M f$, $x_1=f_k \in C$)

$$\|PP_m f_k-P_M f_k\|\leq \|f_k-P_M f_k\|. \quad (29)$$

Hence from equations (28)-(29) we obtain $$\|f_{k+1}-P_M f_{k+1}\|\leq \|f_k-P_M f_k\|, \quad (30)$$

indicating that the distance from the iterate $f_k$ to its nearest neighbor $P_M f_k$ in $C_M$ with the given Fourier transform magnitude is a decreasing function. Hence $$\lim_{k \to \infty} \|f_k - P_M f_k\| = d_o \geq 0. \quad (31)$$

The value of $d_o$ can be greater than or equal to zero. Even if $d_o=0$, that may not guarantee that the iterate in equation (26) converges to a point in $C_M$, since they can "run around" the boundary getting closer to $C_M$ but not converging necessarily to any point.

The following is an embodiment of the present invention which involves generation of constant envelope signals when provided with a given Fourier transform magnitude function. Interestingly, as we show below, the constant envelope signals also share properties similar to the signals with prescribed Fourier transform magnitude function.

Constant Envelope Signals:

A constant envelope signal f(t) can be expressed as $$f(t)=Ae^{j\theta(t)} \quad (32)$$

where A is a suitable positive constant that can be used to maintain a prescribed energy level for f(t). For example if E represents the signal energy, then $A=\sqrt{E}$. Notice that $$|f(t)|=A \text{ for all } t. \quad (33)$$

It is easy to see that, signals with the same constant envelope level do not form a convex set; however their behavior is similar to the signal set with given Fourier transform magnitude. Hence if $C_A$ denotes the set of functions $\{g(t)\}$ that have constant envelope level A, although $C_A$ is not a convex set, it is possible to define an operator $P_A$ that will assign to every arbitrary function f(t) a nearest neighbor $P_A f(t)$ that belongs to $C_A$ such that no other element $g \in C_A$ satisfies (see also equation (20))

$$\|f(t)-g(t)\|<\|f(t)-P_A f(t)\|. \quad (34)$$

Given an arbitrary signal $f(t)=a(t)e^{j\theta(t)}$ to determine $P_A f(t)$, we need $g(t)=Ae^{j\psi(t)}$ such that $\|f(t)-g(t)\|$ is minimum. In this case, we can proceed as in equations (22)-(25). Thus with $$f(t) = a(t)e^{j\theta(t)} \quad (35)$$

$$P_A f(t) = \begin{cases} Ae^{j\theta(t)}, & t \in T \\ f(t), & \text{otherwise} \end{cases} \quad (36)$$

where T represents the temporal duration over which the constant envelope property is to be maintained. Notice that the constant envelope operator $P_A$ defined above also enjoys the error reduction property when employed in an iteration similar to equation (26). Thus with $$f_{k+1} = PP_A f_k \quad (37)$$

where P represents any projection operator, from equations (30)-(31), we also get $$\|f_{k+1} - P_A f_{k+1}\| \leq \|f_k - P_A f_k\|. \quad (38)$$

Thus the error between $f_k$ and its constant envelope version $P_A f_k$ reduces as $k \to \infty$. Constant Envelope Signals with Given Fourier Transform Magnitude function:

More interestingly, if the iteration combines both Fourier transform substitution operation as well as the constant envelope property, then we have $$f_{k+1} = P_A P_M f_k = P_A g_k \quad (39)$$

where we define $$g_k = P_M f_k \quad (40)$$

and the operators $P_M$ and $P_A$ are as defined in (25) and (36) respectively. The constant A in (36) can be determined from the energy requirement for the signal $f_{k+1}$ in (39) which, in general, will be the same as the energy requirement for $g_k$ in (40). In this case also the error reduction property $$d_{k+1} = \|f_{k+1} - P_M f_{k+1}\| \leq \|f_k - P_M f_k\| = d_k \quad (41)$$

is maintained since (see FIG. 6)

$$d_{k+1} = \|f_{k+1} - P_M f_{k+1}\| \leq \|f_{k+1} - P_M f_k\| = \|P_A P_M f_k - P_M f_k\| \leq \|f_k - P_M f_k\| = d_k. \quad (42)$$

This is illustrated in FIG. 6 where line segment 604 and line segment 605 represent consecutive error segments $d_k$ and $d_{k+1}$. Observe that the iteration in equation (41) is an excellent way to prescribe a given Fourier transform magnitude function while maintaining a constant envelope in the time domain, and together they result in iterates that "get closer" in the sense of equation (41). From equation (39), $f_k$ satisfies the constant envelope property as shown by curve 931, while only approximating the given magnitude transform $M(\omega)$ as shown by curve 921; whereas $g_k = P_M f_k$ in (40) possesses the given magnitude transform as shown by curve 941, while only approximating the constant envelope property as shown by curve 951. Nevertheless, after a large number of iterates, as equation (41) shows, the difference between these signals gets smaller. Observe that since there is no unique solution, the final solution is sensitive to the starting point $f_o$, and a careful selection of the initial solution based on other factors is essential.

FIG. 7 shows apparatus 700 including data input device 701, computer processor 702, computer memory 703, and computer monitor or display 704. The data input device 701, at step 801 of Figure 800, receives a given Fourier transform magnitude function $M(\omega)$ such as the given Fourier transform magnitude function shown by curve or function 901 in diagram 900 of FIG. 9A and in addition an acceptable initial signal $f_0(n)$. At step 802 the computer processor 702, receives $M(\omega)$ and $f_0(n)$ from the data input device 701 and computes the first computed Fourier transform function of the signal $f_0(n)$. The computer processor 702, next at step 803, replaces the magnitude function of the first computed Fourier transform function with the given Fourier transform magnitude function $M(\omega)$, such as shown by curve or function 901 of FIG. 9A, while leaving the phase function unchanged and the computer processor 702 computes the inverse Fourier transform of this replaced function, and may store any of these functions in computer memory 704 or display on computer monitor 703. The computer processor 702 at steps 804 and 805, replaces the magnitude of the time domain signal so generated by the inverse Fourier transform with unity. The computer processor 702 at step 806 computes the error function and that is used in steps 803a and 807 as stopping rules. In step 803a if the error $d_k$ at the k-th iteration is less than a prescribed level then the iteration stops and the output at step 803b is used, such as by storing in computer memory 704, displaying on computer monitor 703, transmitting out such as via an antennae, or in some other manner, as the desired signal. The output at step 803b has envelope that is approximately constant in the time domain such as shown by curve 951 of FIG. 9F, and its computed Fourier transform magnitude function as shown by curve 941 in FIG. 9E agrees with the given Fourier transform magnitude function as shown by curve 900 of FIG. 9A. At step 807 if the error at the k-th iteration is less than a prescribed level then the computer processor 702 iteration stops the iteration and the output at 808 is used as the desired signal. The output at step 808 such as shown in 931 of FIG. 9D has the approximate given Fourier transform magnitude function such as 921 of FIG. 9C and has constant envelope such as shown for plot 931 in FIG. 9D.

FIG. 9A shows a given Fourier transform magnitude function 901 and results of iterations using equation (39) and the computer processor 702 and the apparatus 700 of FIG. 7 along with the method shown by flow chart 800 of FIG. 8 to generate constant envelope signals with the given Fourier transform magnitude function starting the iterations with the minimum phase signal associated with curve 901, or any other signal as the input signal $f_o$. Observe the error reduction property for $d_k$ in equation (41) is satisfied by 911 in FIG. 9B.

As mentioned before, the iterate $f_k$ in equation (39) given by plot 931 in FIG. 9D preserves the constant envelope property, but its Fourier transform magnitude function given by curve 921 in FIG. 9C is only approximately close to the given Fourier transform magnitude function $M(\omega)$ in FIG. 9A. On the other hand, from FIG. 9E and FIG. 9F, the signal $g_k = P_M f_k$ in equation (40) given by plot 951 in FIG. 9F preserves the transform magnitude as shown by curve 941 in FIG. 9E and 901 in FIG. 9A, but its envelope is only approximately constant as shown by plot 951 in FIG. 9F. However as the iterations proceed, the error between $f_k$ and $g_k = P_M f_k$ decreases and hence after a sufficient number of steps, the output $f_k$ or $g_k = P_M f_k$ may be used as the desired constant envelope signal with the given transform magnitude. Notice that only one condition is exactly satisfied and the other condition is only approximately satisfied by both of these signals. In particular, the signal $f_k$ maintains exact constant envelope property while approximating the given Fourier transform magnitude function, whereas $g_k$ maintains the exact given Fourier transform magnitude function while approximating the constant envelope property. Depending on which condition is more important, the user can select either $f_k$ or $g_k = P_M f_k$ as the desired signal.

In FIG. 8, the selection of the input signal $f_o$ in the method of flow chart 800 to be executed by the computer processor 702, will influence the final output at step 803b and 808 and these output signals are not unique This is illustrated in FIGS. 10A-D and 11A-D, where in both cases the given Fourier transform magnitude functions or curves 1001 and 1101 in FIGS. 10A and 11A, respectively, are identical (flat, chirplike) with a frequency notch in its spectrum as shown in 1002 and 1102. The minimum phase signal associated with curve 1001 is used as the starting signal $f_o$ together with 1001 in the method of flow chart 800 to generate plot 1012 in FIG. 10B that represents the output at step 803b after four hundred iterations whose computed Fourier transform magnitude function matches given Fourier transform magnitude function 1001, but maintains approximately constant magnitude. The corresponding constant envelope output at step 808 is shown in diagram 1030 of FIG. 10D and its computed Fourier transform magnitude function or curve 1022 is shown in FIG. 10C and approximates given Fourier transform magnitude function 1001 in FIG. 10A.

FIGS. 11A-D repeat the same experiment as in FIGS. 10A-D using a chirp signal with the same bandwidth as the input signal $f_o$ along with the given Fourier transform magnitude function 1101 (same as 1001). Once again the output at step 803b after four hundred iterations is shown in plot 1112 in FIG. 11B, and it has almost constant envelope and maintains the computed Fourier transform magnitude function exactly as the given Fourier transform magnitude function 1101. Similarly the output at step 808 is shown in diagram 1130 of FIG. 11D and it has exact constant envelope, and has the computed Fourier transform magnitude function or spectrum 1122 shown in diagram 1120 in FIG. 11C, that approximates the given Fourier transform magnitude function 1101 in FIG. 11A.

To illustrate the compression properties of these constant envelope signals, the matched filter outputs $$z(n) = s(n) * s^*(N - n) = \sum_k s(k) s^*(n - (N - k)) \quad (43)$$

with s(n) representing the desired signals or curves 1012, 1032, 1112 and 1132, are exhibited in FIGS. 12A, 12B, 12C and 12D respectively. In equation (43), N represents the length of the signal and s*(n) represents the complex conjugate of s(n). Notice that all of outputs have sharp main lobes and side lobes below 10 dB, and depending on whether exact constant envelope property or exact Fourier transform property is desired, the output signals at step 808 or 803b may be selected.

The constant envelope signal or the almost-constant, nearly constant, or substantially constant envelope signal whose computed Fourier transform magnitude function matches the given Fourier transform magnitude function can be used in a variety of applications such as radar, sonar, and communication scenes. For example, the computer processor 702 can communicate with a transmitter (not shown and can cause the transmitter to transmit the constant envelope signal or the almost-constant envelope signal with the prescribed computed Fourier transform magnitude function as a radar signal, sonar signal, or as a communication signal. In all these cases, using the target/channel and interference/noise spectral characteristics, it may be possible to prescribe an optimum spectral magnitude characterization for the transmit signal. Often these transmit signals need to be constant envelope as well to maintain uniform power constraints. The method described here provides an iterative method to generate such signals starting from some desired signal as the initialization point.

We claim:

1. A method comprising
receiving at a computer processor a first time signal for a first iteration; wherein the first iteration is part of a plurality of iterations; during an initialization step;
receiving at the computer processor, a given Fourier transform magnitude function;
repeating the following steps of an iterative process for the plurality of iterations, until the iterative process is stopped, starting with the first iteration:
at the start of a current iteration of the plurality of iterations, computing a Fourier transform function of the first time signal for the current iteration, wherein for each iteration, each computed Fourier transform function is comprised of a computed Fourier transform magnitude function and a computed phase function in the frequency domain;
replacing the computed Fourier transform magnitude function for the current iteration with the given Fourier transform magnitude function to form a modified Fourier transform function for the current iteration comprised of the given Fourier transform magnitude function and the computed phase function for the current iteration;
performing an inverse Fourier transform on the modified Fourier transform function for this iteration to obtain a second time signal for the current iteration in the time domain, wherein the second time signal for the current iteration has a magnitude and phase function in the time domain;
if the difference between the first time signal for the current iteration and the second time signal for the current iteration is less than an error threshold, transmitting the second time signal for the current iteration as an output from a transmitter and stopping the iterative process;
replacing the magnitude of the second time signal for the current iteration with a constant to form a revised first time signal for the current iteration;
if the difference between the revised first time signal for the current iteration and the second time signal for the current iteration is less than the error threshold, transmitting the first time signal, for the current iteration, out from a transmitter, and stopping the iterative process; and
if the difference between the revised first time signal for the current iteration and the second time signal for the current iteration is not less than the error threshold, determining a first time signal for a next iteration of the plurality of iterations, wherein the next iteration immediately follows the current iteration, such that the first time signal for the next iteration is equal to the revised first time signal for the current iteration, and thereafter repeating the iterative process with the current iteration incremented to equal the next iteration, and the next iteration next incremented to be one more than the current iteration, just prior to repeating the iterative process.

2. The method of claim 1 wherein
the constant is selected so that the energy of the revised first time signal is the same as the energy of the second modified time signal.

3. The method of claim 1 wherein
the given Fourier transform magnitude function is flat over a range of frequencies.

4. The method of claim 1 wherein
the given Fourier transform magnitude function has a notch over a frequency band.

5. The method of claim 1 wherein
the difference between the first time signal for the current iteration and the second time signal for the current iteration relates to the difference between the computed Fourier transform magnitude function of the first time signal for the current iteration and the given Fourier transform magnitude function of the second time signal for the current iteration; and
the difference between the first revised time signal for the current iteration and the second signal for the current iteration relates to the difference between the constant amplitude function of the first revised time signal for the current iteration, and the computed amplitude function of the second time signal for the current iteration.

6. A method comprising
receiving a given Fourier transform magnitude function at a data input device;
using a computer processor to determine a substantially constant envelope signal in the time domain having a Fourier transform magnitude function which matches the given Fourier transform magnitude function; and
transmitting the substantially constant envelope signal in the time domain out from a transmitter;
wherein the substantially constant envelope signal in the time domain has a plurality of cycles, including a first cycle and a second cycle;
wherein the substantially constant envelope signal in the time domain has an average power over the first cycle and an average power over the second cycle; and
wherein the average power over the first cycle is approximately equal to the average power over the second cycle.

7. A method comprising
receiving a given Fourier transform magnitude function at a data input device;
using a computer processor to determine a constant envelope signal in the time domain having a Fourier transform magnitude function that substantially matches the given Fourier transform magnitude function; and
transmitting the constant envelope signal in the time domain out from a transmitter; and
wherein the constant envelope signal in the time domain has a plurality of cycles, including a first cycle and a second cycle;
wherein the constant envelope signal in the time domain has an average power over the first cycle and an average power over the second cycle; and
wherein the average power over the first cycle is approximately equal to the average power over the second cycle.

8. The method of claim 1 wherein
the revised first time signal for the current iteration, which is denominated as a k-th iteration, is given by $f_{k+1}$ defined as follows:

$$f_{k+1} = P_A P_M f_k = P_A g_k,$$

where $$g_k = P_m f_k;$$

wherein $f_k$ represents the first time signal for the current iteration, which is denominated as the k-th iteration;
wherein the revised first time signal for the current iteration, which is $f_{k+1}$, and the first time signal for the current iteration, which is $f_k$, both have a constant envelope property;
wherein $g_k$ represents the second time signal for the current iteration and $g_k$ has substantially constant envelope output;
wherein $P_M$ is a Fourier transform magnitude substitution operator and is defined through the relation $$P_M f(t) = \begin{cases} M(\omega)e^{j\psi(\omega)}, & \omega \in \Omega \\ F(\omega), & \omega \in \Omega' \end{cases}$$

wherein f(t) is a signal, F(ω) is a Fourier transform of the signal f(t), and M(ω) is the given Fourier transform magnitude function which is not the same as a Fourier transform magnitude function that would be obtained from performing a Fourier transform on f(t), and ψ(t), is a Fourier transform phase function with f(t) ↔ F(ω)=|F(ω)|$e^{j\psi(\omega)}$ representing the Fourier transform pair in time and frequency domains respectively, and M(ω) is the given Fourier transform magnitude function, such that M(ω) is not equal to |F(ω)|, and Ω represents a desired frequency band and Ω' its complement frequency band;
wherein $P_A$ is a constant magnitude substation operator defined through the relation:

$$P_A f(t) = \begin{cases} Ae^{j\theta(t)}, & t \in T \\ f(t), & \text{otherwise} \end{cases}$$

wherein f(t)=a(t)$e^{j\theta(t)}$; wherein T is the duration of the time domain signal f(t), wherein A is a constant, and θ(t) is a phase function in the time domain;
wherein the difference between the first time signal for the current iteration and the
second time signal for the current iteration is an error signal $d_k = \|f_k - g_k\|$ and the error
signal is used as a stopping rule to cause the iterative process to be stopped,
and wherein the second time signal for the current iteration, which is $g_k$, at the time when the iterative process is stopped, possesses a substantially constant envelope property and the Fourier transform magnitude function of the second time signal for the current iteration, at the time when the iterative process is stopped, matches the given Fourier transform magnitude function M(ω) exactly.

9. The method of claim 8 wherein
the first time signal for the current iteration, which is $f_k$, at the time when the iterative process is stopped possesses an exact constant envelope property and the Fourier transform magnitude function of the first time signal for the current iteration, at the time when the iterative process is stopped substantially matches the given Fourier transform magnitude function M(ω).

10. The method of claim 8 wherein
the second time signal for the current iteration, which is $g_k$, at the time when the iterative process is stopped possesses a substantially constant envelope property and the Fourier transform magnitude function of the second time signal for the current iteration by design procedure matches the given Fourier transform magnitude function M(ω) exactly.

11. The method of claim 1 wherein
when the iterative process is stopped, the first time signal for the current iteration or the second time signal for the current iteration is transmitted out as part of a radar transmit waveform.

12. The method of claim 1 wherein
when the iterative process is stopped, the first time signal for the current iteration or the second time signal for the current iteration is transmitted out as part of a communication transmission process.

13. An apparatus comprising
a data input device configured to receive a first time signal for a first iteration during an initialization step, wherein the first iteration is part of a plurality of iterations,
the data input device also configured to receive a given Fourier transform magnitude function;
a transmitter;
a computer processor programmed to execute and repeat the following steps of an iterative process for the plurality of iterations, until the iterative process is stopped, starting with the first iteration:
at the start of a current iteration of the plurality of iterations, computing a Fourier transform function of the first time signal for the current iteration, wherein for each iteration, each computed Fourier transform function is comprised of a computed Fourier transform magnitude function and a computed phase function in the frequency domain;
replacing the computed Fourier transform magnitude function for the current iteration with the given Fourier transform magnitude function to form a modified Fourier transform function for this iteration comprised of the given Fourier transform magnitude function and the computed phase function for the current iteration;
performing an inverse Fourier transform on the modified Fourier transform function for the current iteration to obtain a second time signal for the current iteration in the time domain, wherein the second time signal for the current iteration has a magnitude and phase function in the time domain;
if the difference between the first time signal for the current iteration and the second time signal for the current iteration is less than an error threshold, transmitting the second time signal as an output from the transmitter and stopping the iterations;
replacing the magnitude of the second time signal for the current iteration with a constant to form a revised first time signal for the current iteration;
if the difference between the revised first time signal for the current iteration and the second time signal for the current iteration is less than the error threshold, transmitting the first time signal for the current iteration out from the transmitter, and stopping the iterative process; and
if the difference between the revised first signal for the current iteration and the second time signal for the current iteration is not less than the error threshold, determining a first time signal for a next iteration of the plurality of iterations, wherein the next iteration immediately follows the current iteration, wherein the first time signal for the next iteration is equal to the revised first time signal for the current iteration, and thereafter repeating the iterative process with the current iteration incremented to equal the next iteration, and the next iteration next incremented to be one more than the current iteration, just prior to repeating the iterative process.

14. The apparatus of claim 13 wherein
the computer processor is programmed to select the constant so that the energy of the revised first time signal for the current iteration is the same as the energy of the second time signal for the current iteration.

15. The apparatus of claim 13 wherein
the given Fourier transform magnitude function is flat over a range of frequencies.

16. The apparatus of claim 13 wherein
the given Fourier transform magnitude function has a notch over a frequency band.

17. The apparatus of claim 13 wherein
the difference between the first time signal for the current iteration and the second time signal for the current iteration relates to the difference between the computed Fourier transform magnitude function of the first time signal for the current iteration and the given Fourier transform magnitude function of the second time signal for the current iteration; and
the difference between the first revised time signal for the current iteration and the second time signal for the current iteration relates to the difference between the constant amplitude function of the first revised time signal for the current iteration, and the computed amplitude function of the second time signal for the current iteration.

18. An apparatus comprising
a data input device configured to receive to receive a given Fourier transform magnitude function;
a transmitter;
a computer processor programmed to determine a substantially constant envelope signal in the time domain having a Fourier transform magnitude function which matches the given Fourier transform magnitude function; and
wherein the computer processor is programmed to cause the substantially constant envelope signal in the time domain to be transmitted out from the transmitter; and
wherein the substantially constant envelope signal in the time domain has a plurality of cycles, including a first cycle and a second cycle;
wherein the substantially constant envelope signal in the time domain has an average power over the first cycle and an average power over the second cycle; and
wherein the average power over the first cycle is approximately equal to the average power over the second cycle.

19. The apparatus of claim 18 wherein
a computer processor programmed to determine a constant envelope signal in the time domain having a Fourier transform magnitude function which substantially matches the given Fourier transform magnitude function; and
wherein the computer processor is programmed to cause the constant envelope signal in the time domain to be transmitted out from the transmitter; and
wherein the substantially constant envelope signal in the time domain has a plurality of cycles, including a first cycle and a second cycle;
wherein the substantially constant envelope signal in the time domain has an average power over the first cycle and an average power over the second cycle; and
wherein the average power over the first cycle is approximately equal to the average power over the second cycle.

20. The apparatus of claim 13 wherein
the revised first time signal for the current iteration, which is denominated as a k-th iteration, is given by $f_{k+1}$ defined as follows:

$$f_{k+1} = P_A P_M f_k = P_A g_m,$$

where $$g_k = P_M f_k;$$

wherein $f_k$ represents the first time signal for the current iteration, which is denominated as the k-th iteration;

wherein the revised first time signal for the current iteration, which is $f_{k+1}$, and the first time signal for the current iteration, which is $f_k$, both have a constant envelope property;

wherein $g_k$ represents the second time signal for the current iteration and $g_k$ has substantially constant envelope output;

wherein $P_M$ is a Fourier transform magnitude substitution operator and is defined through the relation $$P_M f(t) = \begin{cases} M(\omega)e^{j\psi(\omega)}, & \omega \in \Omega \\ F(\omega), & \omega \in \Omega' \end{cases}$$

wherein f(t) is a signal, $F(\omega)$ is a Fourier transform of the signal f(t), and $M(\omega)$ is the given Fourier transform magnitude function which is not the same as a Fourier transform magnitude function that would be obtained from performing a Fourier transform on f(t), and $\psi(\omega)$, is a Fourier transform phase function with $f(t) \leftrightarrow F(\omega) = |F(\omega)|e^{j\psi(\omega)}$ representing the Fourier transform pair in time and frequency domains respectively, and $M(\omega)$ is the given Fourier transform magnitude function, such that $M(\omega)$ is not equal to $|F(\omega)$, and $\Omega$ represents a desired frequency band and $\Omega'$ its complement frequency band;

wherein $P_A$ is a constant magnitude substation operator defined through the relation:

$$P_A f(t) = \begin{cases} Ae^{j\theta(t)}, & t \in T \\ f(t), & \text{otherwise} \end{cases}$$

wherein $f(t) = a(t)e^{j\theta(t)}$; wherein T is the duration of the time domain signal f(t), wherein A is a constant, and $\theta(t)$ is a phase function in the time domain;

wherein the difference between the first time signal for the current iteration and the second time signal for the current iteration is an error signal $d_k = \|f_k - g_k\|$ and the error signal is used as a stopping rule to by the computer processor to stop the iterative process, and wherein the second time signal for the current iteration, which is $g_k$, at the time when the iterative process is stopped, possesses a substantially constant envelope property and the Fourier transform magnitude function of the second time signal for the current iteration, at the time when the iterative process is stopped, matches the given Fourier transform magnitude function $M(\omega)$ exactly.

21. The apparatus of claim 20 wherein the first time signal for the current iteration, which is $f_k$, at the time when the iterative process is stopped, possesses an exact constant envelope property and the Fourier transform magnitude function of the first time signal for the current iteration, at the time when the iterative process is stopped substantially matches the given Fourier transform magnitude function $M(\omega)$.

22. The apparatus of claim 20 wherein the second time signal for the current iteration, which is $g_k$, at the time when the iterative process is stopped possesses a substantially constant envelope property and the Fourier transform magnitude function of the second time signal for the current iteration at the time when the iterative process is stopped matches the given Fourier transform magnitude function $M(\omega)$ exactly.

23. The apparatus of claim 13 wherein when the iterative process is stopped, the computer processor causes the first time signal for the current iteration or the second time signal for the current iteration to be transmitted out from the transmitter as part of a radar transmit waveform.

24. The apparatus of claim 13 wherein when the iterative process is stopped, the computer processor causes the first time signal for the current iteration or the second time signal for the current iteration to be transmitted out from the transmitter as part of a communication transmission process.

* * * * *